United States Patent [19]

Ogawa et al.

[11] Patent Number: 5,053,871
[45] Date of Patent: Oct. 1, 1991

[54] STILL VIDEO CAMERA WITH AUTOMATIC EXPOSURE CONTROL AND FLICKER DETECTION

[75] Inventors: Takeshi Ogawa, Kanagawa; Masao Suzuki, Tokyo, both of Japan

[73] Assignee: Canon Kabushiki Kaisha, Tokyo, Japan

[21] Appl. No.: 513,238

[22] Filed: Apr. 23, 1990

[51] Int. Cl.⁵ .............................................. H04N 5/30
[52] U.S. Cl. .............................. 358/209; 358/213.19; 358/228; 358/909; 358/29
[58] Field of Search ........... 358/909, 209, 211, 213.19, 358/213.18, 228, 906

[56] References Cited

U.S. PATENT DOCUMENTS

| | | | |
|---|---|---|---|
| 4,739,409 | 4/1988 | Baumeister | 358/213.19 |
| 4,805,102 | 2/1989 | Shroyer et al. | 358/909 |
| 4,845,476 | 7/1989 | Fujioka et al. | 358/213.19 |
| 4,860,113 | 8/1989 | Miyamoto et al. | 358/909 |
| 4,887,121 | 12/1989 | Pritchard | 358/228 |
| 4,935,817 | 6/1990 | Gilliean | 358/211 |

FOREIGN PATENT DOCUMENTS 9703242 12/1983 European Pat. Off.

Primary Examiner—Howard W. Britton
Assistant Examiner—Tuan V. Ho
Attorney, Agent, or Firm—Robin, Blecker, Daley & Driscoll

[57] ABSTRACT

A still video camera comprising a memory circuit storing an ordinary automatic exposure program chart and another automatic exposure program chart suited to a flickering light source, a judging circuit for determining, prior to image sensing, whether or not a light source related to an object to be photographed is the flickering light source, an automatic white balance adjusting circuit for forming an automatic white balance adjusting signal prior to image sensing, and adjusting the white balance of a video signal obtained by image sensing on the basis of the automatic white balance adjusting signal, a selecting circuit responsive to that output of the judging circuit which represents that the light source related to the object is not the flickering light source for selecting the ordinary automatic exposure program chart from the memory circuit or responsive to that output of the judging circuit which represents that the light source related to the object is the flickering light source for selecting the automatic exposure program chart suited to the flickering light source, and an automatic exposure determining circuit for deriving value of the aperture size and the shutter speed to be used in making an exposure by computation based on the automatic exposure program chart selected by the selecting circuit.

22 Claims, 4 Drawing Sheets

STILL VIDEO CAMERA WITH AUTOMATIC EXPOSURE CONTROL AND FLICKER DETECTION

BACKGROUND OF THE INVENTION

1. Field of the Invention

This invention relates to still video cameras (electronic still cameras) capable of automatic white balance adjustment.

2. Description of the Related Art

The conventional still video camera, when sensing a image, determines the size of diaphragm aperture and the shutter speed by a program chart for automatic exposure adjustment such as that shown in FIG. 1 (hereinafter called the automatic exposure program chart). With this, as the brightness of an object to be photographed (or EV: Exposure Value) increases, the shutter speed is made to increase and at the same time the iris (diaphragm) is stopped down.

In the above-described conventional example, however, if the fluorescent lamp or like light source that has flickering is used and the shutter speed is high, false colors arising when the fluorescent lamp flickers may be detected. Hence, there is a problem that the white balance of the sensed image is flawed even if the automatic white balance adjustment is performed.

SUMMARY OF THE INVENTION

To solve this problem, the present invention has been made, and its object is to provide a still video camera which assures correct white balance adjustment even when a light source that has flickering is in use.

To achieve the above-described object, in an embodiment of the invention, when sensing an image under a flickering light source, the camera is made to operate with selection of one of automatic exposure program charts suited to that light source. In more detail, the still video camera is constructed in the following way (1) or (2):

(1) The still video camera is provided with constituent elements "a" through "e" to be described below.

a. memory means for storing an ordinary automatic exposure program chart and an automatic exposure program chart suited to a light source that has flickering;

b. judging means for judging, prior to image sensing whether or not a light source related to an object to be photographed is a light source that has flickering;

c. automatic white balance adjusting means for producing an automatic white balance adjusting signal prior to image sensing, and for automatically adjusting the white balance of a video signal obtained by image sensing on the basis of the automatic white balance adjusting signal;

d. selecting means for selecting the ordinary automatic exposure program chart stored in the memory means when the judging means has judged that the light source related to the object is not the light source that has flickering, and for selecting the automatic exposure program chart suited to the light source that has flickering and stored in the memory means when the judging means has judged that the light source related to the object is the light source that has flickering; and e. automatic exposure determining means for computing and determining an aperture value and shutter speed on the basis of the automatic exposure program chart selected by the selecting means.

(2) In the aforesaid way (1), the still video camera is further provided with display means, responsive to occurrence of an event that the automatic exposure determining means is not able to determine a required shutter speed on the basis of the automatic exposure program chart suited to the light source that has flickering, for making a display indicating the event.

According to the above-described ways (1) and (2), when sensing an image under a light source that has flickering, the shutter speed is limited to a certain slow value by the automatic exposure program chart suited to the light source that has flickering.

Also, according to the way (2), as the object is too bright, when the required shutter speed on the basis of the automatic exposure program chart suited to the light source that has flickering cannot be determined, a display indicating that fact is made.

Other objects and features of the invention will become apparent from the following detailed description of a preferred embodiment thereof.

DETAILED DESCRIPTION OF THE PREFERRED EMBODIMENT

The present invention is next described in connection with an embodiment thereof.

Figure 2:
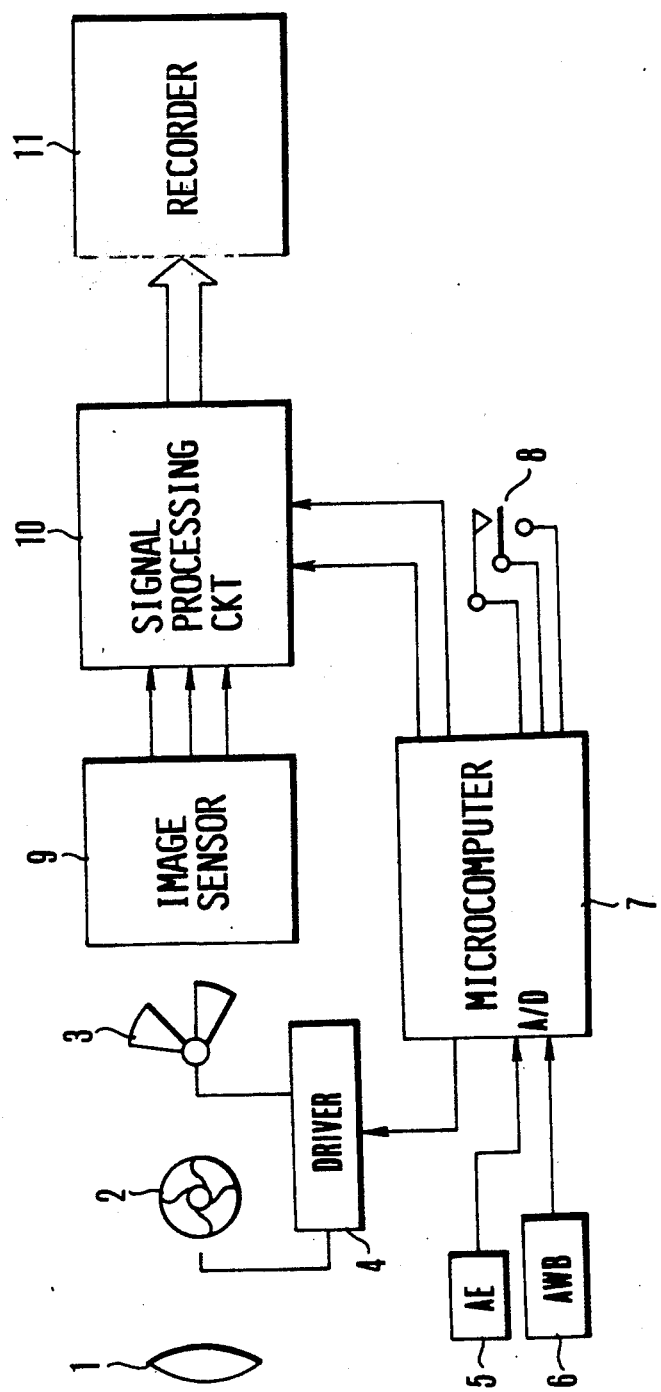
FIG. 2 is a block diagram of an embodiment of the invention.

FIG. 2 in block diagram shows the embodiment of a still video camera according to the invention comprising a lens 1, an iris (diaphragm) 2, a mechanical shutter unit 3, a driver 4, an AE (automatic exposure adjustment) sensor 5, an AWB (Automatic White Balance adjustment) sensor 6, a microcomputer 7, a shutter switch 8, an image sensor 9 using a CCD or the like, a signal processing circuit 10 and a recorder 11. The shutter switch 8 has a first switch which is arranged to turn on when a shutter release button (not shown) is pushed to the first stroke, and a second switch which is arranged to turn on when to the second stroke.

Figure 1:
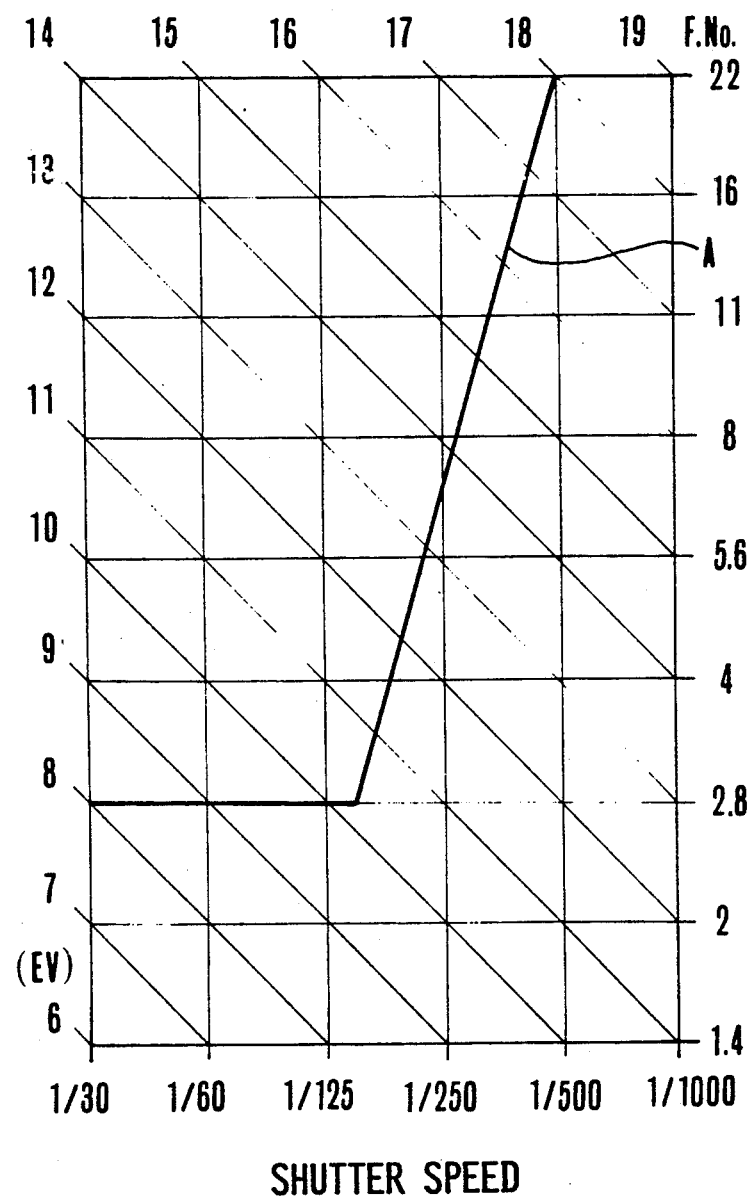
FIG. 1 is a an ordinary automatic exposure program chart.
Figure 3:
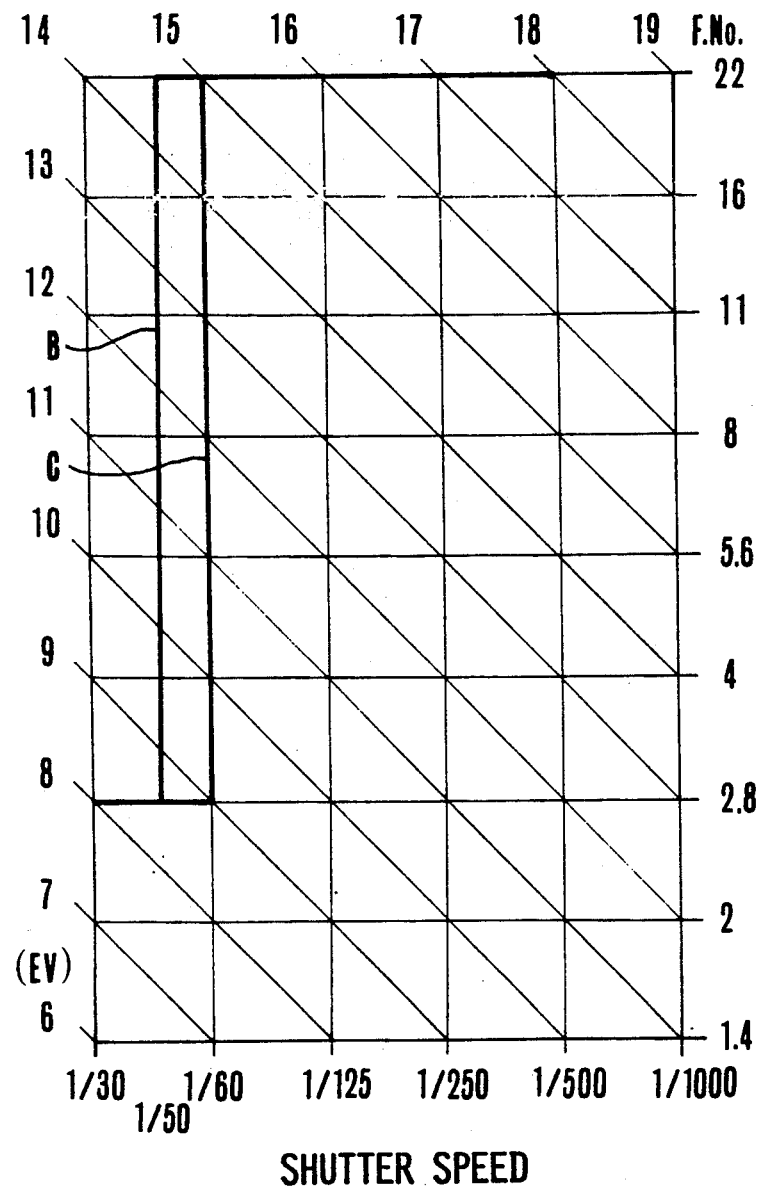
FIG. 3 is an automatic exposure program chart suited to a light source that has flickering.

The microcomputer 7 has a ROM (read-only memory) (memory means) incorporated therein, in which the ordinary automatic exposure program chart shown by A in FIG. 1 and the automatic exposure program chart suited to the two types of light sources that have flickering shown by B and C in FIG. 3 are stored.

In addition, the microcomputer 7 includes the following means a, b, c and d materialized in software form:

a. judging means for reading a signal from the AE sensor 5 in such timing that the first switch turns on to determine an exposure value prior to image sensing, and for judging whether or not a light source illuminating an object to be photographed or a light source that is the object (hereinafter referred to as the light source related to the object) is a light source that has flickering;

b. means for reading a signal from the AWB sensor 6 in such timing that the first switch turns on to form an automatic white balance adjusting signal;

c. selecting means for selecting the ordinary automatic exposure program chart A stored in the ROM when the judging means has judged the light source related to the object is not the light source that has flickering, and for selecting the automatic exposure program chart B or C suited to the light source that has flickering and stored in the ROM when the judging means has judged that the light source related to the object is the light source that has flickering; and d. automatic exposure determining means for computing and determining an aperture value and a shutter speed on the basis of the automatic exposure program chart selected by the selecting means.

Also, the signal processing circuit 10 includes, besides a color signal forming circuit and a color-difference signal forming circuit, a circuit receptive of the aforesaid automatic white balance adjusting signal for adjusting the white balance of the video signal obtained by image sensing.

Next, the operation is described.

When the first switch of the switch 8 turns on in response to depression of the shutter release button, the microcomputer 7 reads the signal of the AE sensor 5 and the signal of the AWB sensor 6. In the microcomputer 7, from the signal of the AWB sensor 6, an automatic white balance adjusting signal is formed.

The microcomputer 7 also carries out sampling of the signal of the AE sensor 5 for more than 1/50 sec. to determine the exposure value to be used for sensing an image. At the same time, depending on whether or not the difference between the maximum and minimum of the sampled values is above a certain threshold level, the microcomputer 7 discriminates whether or not the light source related to the object is a light source that has flickering.

If, as the light source is judged to be the light source that has flickering, the interval between the moments at which the minimum and maximum values are detected is about 1/200 sec., one of the automatic exposure program charts which is suited to such a flickering light source, in this instance, that shown by B in FIG. 3, is selected from the ROM, or if it is about 1/240 sec., the other of the automatic exposure program charts suited to the flickering light source, in this instance, that shown by C in FIG. 3, is selected from the ROM.

When the given light source is judged not to be the light source that has flickering, the ordinary automatic exposure program chart shown by A in FIG. 1 is selected.

Then, from the aforesaid exposure value and the selected automatic exposure program chart, an aperture value and a shutter speed to be used in making an actual exposure are derived by computation.

As the shutter release button is depressed further the second switch of the switch 8 turns on and an exposure of the image sensor 9 with the previously determined aperture value and shutter speed is initiated.

The performance of such an operation insures that, even if, as the light source related to the object is flickering like the fluorescent lamp, the color temperature periodically changes with flickering, the correct white balance can be carried out by the automatic white balance adjusting signal formed, prior to making the exposure, from the output of the AWB sensor 6, because the exposure is made to last far longer a time than the flickering period to obtain video signals at the sufficiently averaged color temperature.

Figure 4:
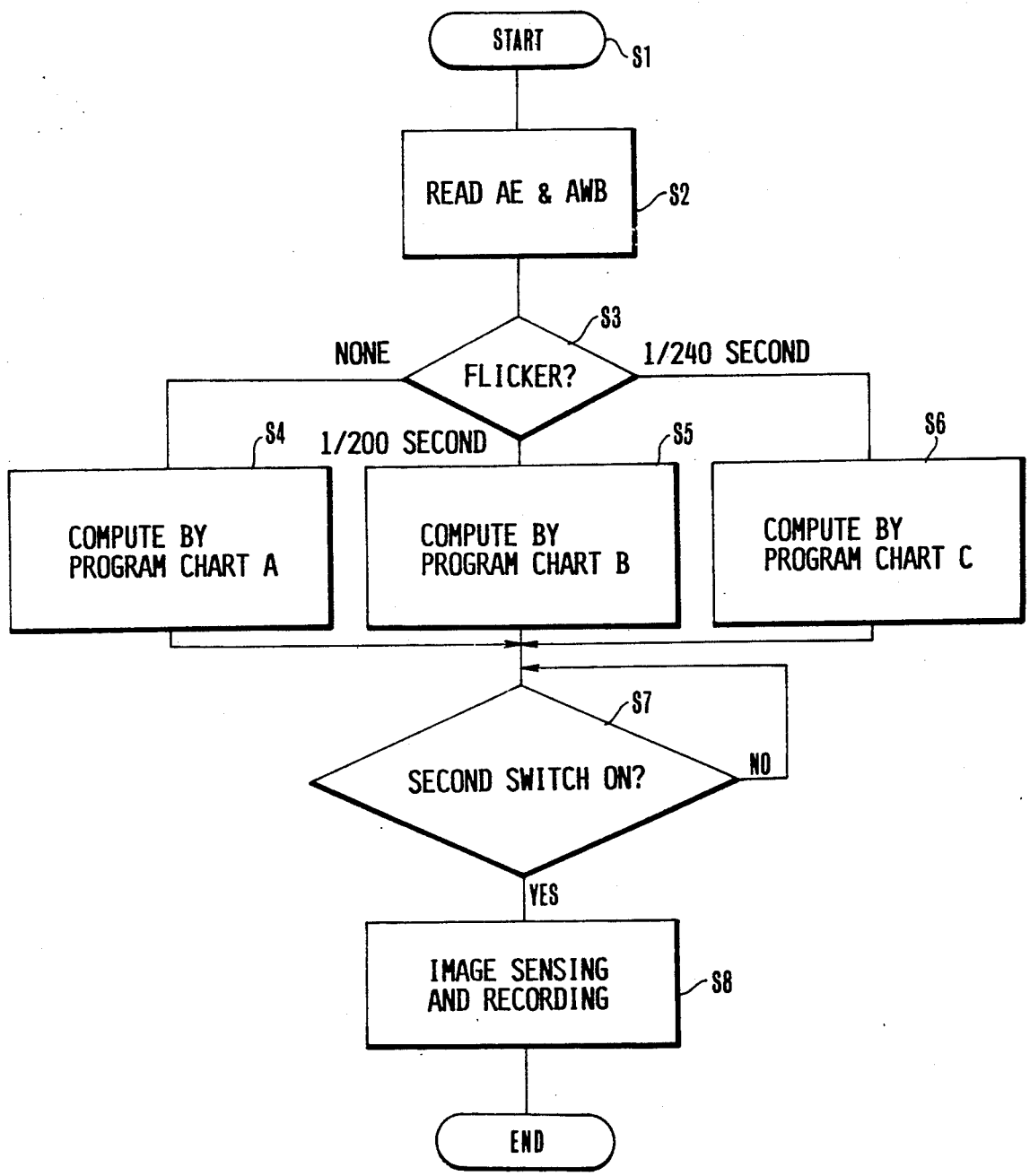
FIG. 4 is a flowchart for the operation of the above-described embodiment.

FIG. 4 is a flowchart illustrating the outline of the above-described process.

A step S1 is to push the shutter release button to the first stroke at which the first switch of the switch 8 turns on. In a step S2, the signal of the AE sensor 5 and the signal of the AWB sensor 6 are read by the microcomputer 7, then the exposure value is determined, and the automatic white balance adjusting signal is formed.

Whether or not the given light source is the light source that has flickering is checked in a step S3. If the light source is not of the flickering type, the process advances to a step S4. If the light source is of the flickering type, for a time space of about 1/200 sec. between the minimum and maximum intensities of its light, a branch to a step S5 occurs, or for another time space of about 1/240 sec. a branch to a step S6 occurs, so that, based on the aforesaid exposure value and either one of the program charts for the flickering types, the aperture value and shutter speed to be used for sensing an image are determined by computation.

When the second switch of the switch 8 turns on as detected in a step S7, the process proceeds to a step S8, where the driver 4 moves the iris 2 and the mechanical shutter unit 3 to the previously determined settings, and the exposure is made. The output of the image sensor 9 is subjected to prescribed signal treatments including the white balance adjustment in the signal processing circuit 10, and then recorded by the recorder 11.

It should be noted that the present invention is not confined to those forms of the automatic exposure program charts which are shown in FIG. 1 and FIG. 3. For example, the line curve B or C may be modified to include a slant line in part. Another example of modification is that when the exposure value to be used for sensing an image is so large as not to be possible with the required value, say 1/50 or 1/60 sec. of shutter speed in the line curve B or C, the warning display may be presented in another form of sounding a buzzer, flickering an indicator lamp, showing up a message on the liquid crystal panel, or in other suitable forms. Also, the iris is not necessarily of the separate type, but a diaphragm-cum-shutter may be employed.

Further, the present invention is not confined to the camera having the mechanical shutter, but applicable even to another type of camera in which the electric charge accumulating time is controlled, or what is so-called "having an electronic shutter", and another type in which the image sensor also serves as the AE sensor or AWB sensor, too.

It should also be noted that though, in the above-described embodiment, the aperture value has been determined independently of the presence of the flickering, this determination of the aperture value may otherwise be made variable depending on whether the flickering is present or absent, and how long the flickering period is.

In this connection it should be explained that, since the exposure time in the flickering case becomes shorter than that in the case of its absence, for the exposure time set to the predetermined value (B or C) in response to detection of the presence of flickering, the size of the aperture opening of the diaphragm is increased to a larger value with increase of the brightness of the object than that when there is no flickering.

By this, it is insured that the predetermined exposure value is obtained. Thus, the situation of the incapability of image sensing due to the reliance of the setting of the exposure time on the curve B or C can be averted.

As has been described above, according to the invention, whether or not the light source related to an object to be photographed is of the flickering type is tested to selectively employ the automatic exposure program charts, thereby giving an advantage that even when sensing an image under a flickering light source, correct automatic adjustment of the white balance can be performed.

What is claimed is:

1. A still video camera comprising:
   (a) memory means for storing an ordinary automatic exposure program chart and an automatic exposure program chart suited to a light source that has flickering;
   (b) judging means for judging, prior to image sensing, whether or not a light source related to an object to be photographed is the light source that has flickering;
   (c) automatic white balance adjusting means for producing an automatic white balance adjusting signal prior to image sensing, and for adjusting the white balance of a video signal obtained by image sensing on the basis of the automatic white balance signal;
   (d) selecting means for selecting the ordinary automatic exposure program chart stored in said memory means when said judging means had judged that the light source related to the object is not the light source that has flickering, and for selecting the automatic exposure program chart suited to the light source that has flickering and stored in said memory means when the judging means has judged that the light source related to the object is the light source that has flickering;
   (e) automatic exposure determining means for computing and determining an aperture value and a shutter speed to be used for image sensing on the basis of the automatic exposure program chart selected by said selecting means; and
   (f) display means, responsive to occurrence of an event that said automatic exposure determining means is unable to determine a required shutter speed on the basis of the automatic exposure program chart suited to the light source that has flickering, for making a display indicating said event.

2. A camera according to claim 1, wherein said memory means includes a ROM.

3. A camera according to claim 1, wherein said judging means, said automatic white balance adjusting means, said selecting means and said automatic exposure determining means are constructed in the form of a microcomputer.

4. A video camera comprising image sensing means for converting an image sensing light from an object to be photographed into an electrical signal and outputting the electric signal; white balance adjusting means for adjusting the white balance of the electrical signal; detecting means for detecting a flickering period of a light source related to the object; and control means for setting an amount of exposure determined by an opening diameter of an iris and a shutter speed for said image sensing means according to a detection output of said detecting means.

5. A camera according to claim 4, wherein said image sensing means includes a CCD.

6. A camera according to claim 4, wherein said control means and said detecting means include a microcomputer.

7. A camera according to claim 4, wherein said control means sets the shutter speed to a predetermined value when the flickering period is detected.

8. A camera according to claim 7, wherein said predetermined value is shorter than the shutter speed set when the flickering period is not detected.

9. A camera according to claim 4, wherein said control means has a function of judging that image sensing is impossible with the shutter speed set by said control means.

10. A camera according to claim 4, wherein said control means has a function of judging that image sensing is impossible with the shutter speed set by said control means, and a function of giving a warning when image sensing has been judged to be impossible.

11. A video camera comprising image sensing means for converting an image sensing light from an object to be photographed into an electrical signal and outputting the electrical signal; white balance adjusting means for adjusting the white balance of the electrical signal; detecting means for detecting whether or not a light source related to the object has a flickering component, and detecting a flickering period; and control means for setting an amount of exposure determined by an opening diameter of an iris and a shutter speed for said image sensing means according to a detection output of said detecting means.

12. A camera according to claim 11, wherein said image sensing means includes a CCD.

13. A camera according to claim 11, wherein said control means and said detecting means include a microcomputer.

14. A camera according to claim 11, wherein said control means sets the shutter speed to a predetermined value when the flickering component is detected.

15. A camera according to claim 14, wherein said predetermined value is shorter than the shutter speed set when the flickering component is not detected, and is set according to the flickering period.

16. A camera according to claim 14, wherein said control means has a function of judging that image sensing is impossible with the shutter speed set by said control means.

17. A camera according to claim 14, wherein said control means has a function of judging that image sensing is impossible with the shutter speed set by said control means, and a function of giving a warning when image sensing has been judged to be impossible.

18. A video camera in which white balance adjustment is performed on a video signal obtained by photoelectrically converting an image formed with light from an object to be photographed by image sensing means, comprising control means for detecting a flickering period of a light source and setting an exposure time for said image sensing means so that it is longer than said flickering period, and
   shutter means for controlling the exposure time for said image sensing means according to the setting of said control means.

19. A camera according to claim 18, wherein an exposure value is determined by said exposure time and an aperture size.

20. A camera according to claim 18, wherein said control means, when shortening the exposure time, widens an aperture size.

21. A camera according to claim 18, wherein said control means includes a microcomputer.

22. A camera according to claim 18, wherein said control means has a lookup table of the exposure time and an aperture size and extracts a predetermined value out of said lookup table according to the flickering period.

* * * * *

UNITED STATES PATENT AND TRADEMARK OFFICE
CERTIFICATE OF CORRECTION

PATENT NO.   : 5,053,871
DATED        : October 1, 1991
INVENTOR(S)  : Takeshi Ogawa and Masao Suzuki It is certified that error appears in the above-identified patent and that said Letters Patent is hereby corrected as shown below:

On the Title Page:
Insert -- [30] Foreign Application Priority Data Apr. 28, 1989 [JP] Japan.... 1-107828 --

Col. 1, line 13.  Change "a" to -- an --

Col. 2, line 26.  Delete "a"

Signed and Sealed this

Second Day of August, 1994

Attest:

BRUCE LEHMAN

Attesting Officer    Commissioner of Patents and Trademarks